US012704003B2

(12) United States Patent
Burgoon

(10) Patent No.: US 12,704,003 B2
(45) Date of Patent: Aug. 11, 2026

(54) MODULAR GRIP SYSTEM FOR HANDCUFFS

(71) Applicant: Stephen T. Burgoon, Pottsville, PA (US)

(72) Inventor: Stephen T. Burgoon, Pottsville, PA (US)

( * ) Notice: Subject to any disclaimer, the term of this patent is extended or adjusted under 35 U.S.C. 154(b) by 17 days.

(21) Appl. No.: 18/630,884

(22) Filed: Apr. 9, 2024

(65) Prior Publication Data

US 2025/0163731 A1 May 22, 2025

Related U.S. Application Data

(60) Provisional application No. 63/601,320, filed on Nov. 21, 2023.

(51) Int. Cl.
*E05B 75/00* (2006.01)

(52) U.S. Cl.
CPC .................................... *E05B 75/00* (2013.01)

(58) Field of Classification Search
CPC ........................................................ E05B 75/00
USPC .............................................................. 70/16
See application file for complete search history.

(56) References Cited

U.S. PATENT DOCUMENTS 4,840,048 A * 6/1989 Elam ........................ E05B 75/00 70/16
5,007,257 A * 4/1991 Thompson .............. E05B 75/00 224/914
5,526,658 A * 6/1996 Cross ....................... E05B 75/00 70/16
D373,446 S * 9/1996 Kim ......................... E05B 75/00 D29/120.2
5,613,381 A * 3/1997 Savage .................... E05B 75/00 70/18
6,305,814 B1 * 10/2001 Giamas ................... E05B 17/10 362/276
6,886,374 B2 * 5/2005 Clifton, Jr. .............. E05B 75/00 70/16
7,010,943 B1 * 3/2006 Earl ......................... E05B 75/00 70/16
7,181,935 B1 * 2/2007 Earl ......................... E05B 75/00 70/16
8,776,555 B1 * 7/2014 Lofgren .............. E05B 15/0046 70/16
10,036,184 B1 * 7/2018 Sims ....................... A01K 15/04

(Continued)

*Primary Examiner* — Nathan Cumar
(74) *Attorney, Agent, or Firm* — Miller Law Group, PLLC

(57) ABSTRACT

A handcuff apparatus includes accessory rails formed on the bottom surface of the handcuff member housings. The accessory rail can have a T-shaped configuration to provide support for desired accessories, such as a spacer that will extend between accessory rails on the housings of opposing handcuff members to convert the handcuff apparatus into a rigid handcuff configuration. Placement of the spacer can be made on accessory rails on either or both opposing sides of the mount for connecting the flexible tether between the handcuff members. The accessory rails can also be used to mount other accessories, such as a GPS/cellular tracking device. A grip apparatus is also provided to facilitate the engagement of the handcuff members. The grip members can have a recessed keyhole surrounded by LEDs and a double lock button accessible through the grip member. The grip member is selectively removable from the housing.

13 Claims, 9 Drawing Sheets

(56) References Cited

U.S. PATENT DOCUMENTS

| | | | | |
|---|---|---|---|---|
| 11,479,994 | B1 * | 10/2022 | Conley | E05B 75/00 |
| 2004/0216501 | A1 * | 11/2004 | Clifton, Jr. | E05B 75/00<br>70/16 |
| 2007/0056332 | A1 * | 3/2007 | Parsons | E05B 75/00<br>70/16 |
| 2013/0133382 | A1 * | 5/2013 | Thompson | E05B 75/00<br>70/431 |
| 2017/0081878 | A1 * | 3/2017 | Danner, Jr. | E05B 75/00 |
| 2022/0207635 | A1 * | 6/2022 | Hughes | E05B 45/00 |
| 2023/0087338 | A1 * | 3/2023 | Conley | E05B 75/00<br>70/16 |
| 2023/0141400 | A1 * | 5/2023 | Rebro | A61B 5/0022<br>600/301 |
| 2025/0163731 | A1 * | 5/2025 | Burgoon | E05B 75/00 |

* cited by examiner

Fig. 7
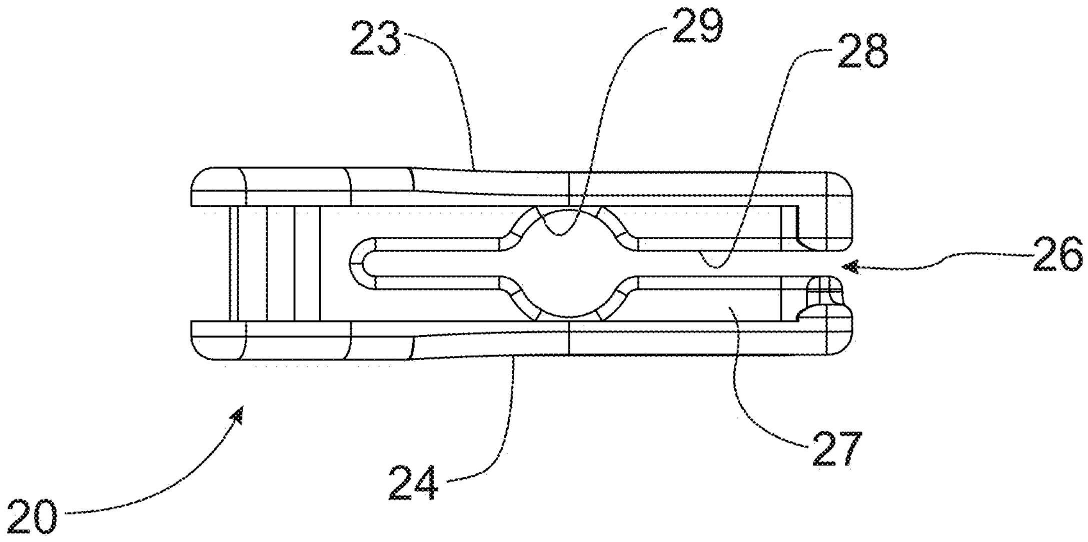
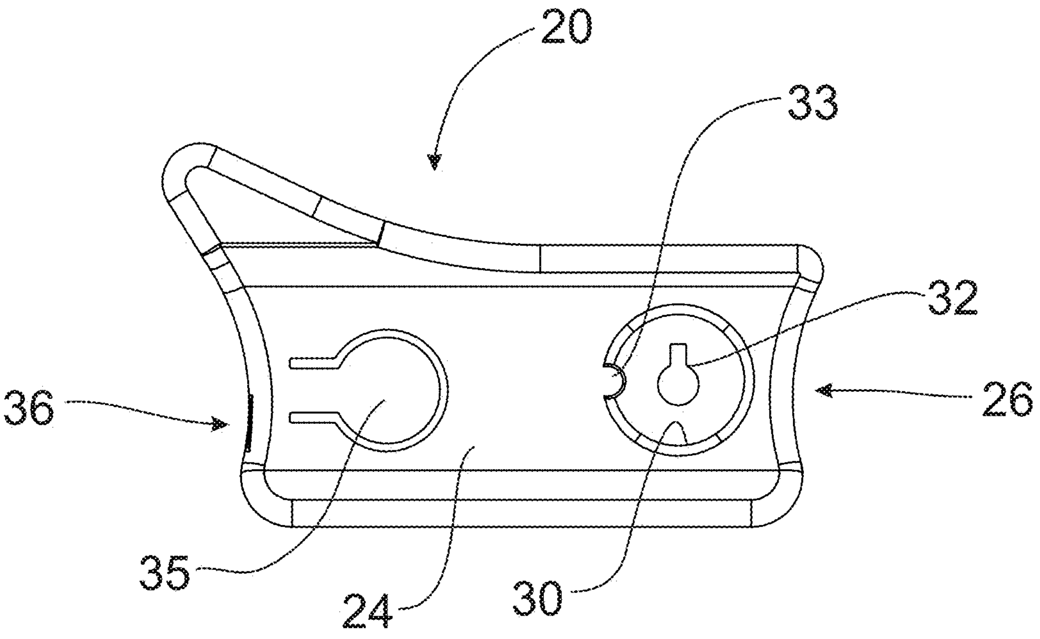
Fig. 8

Fig. 9
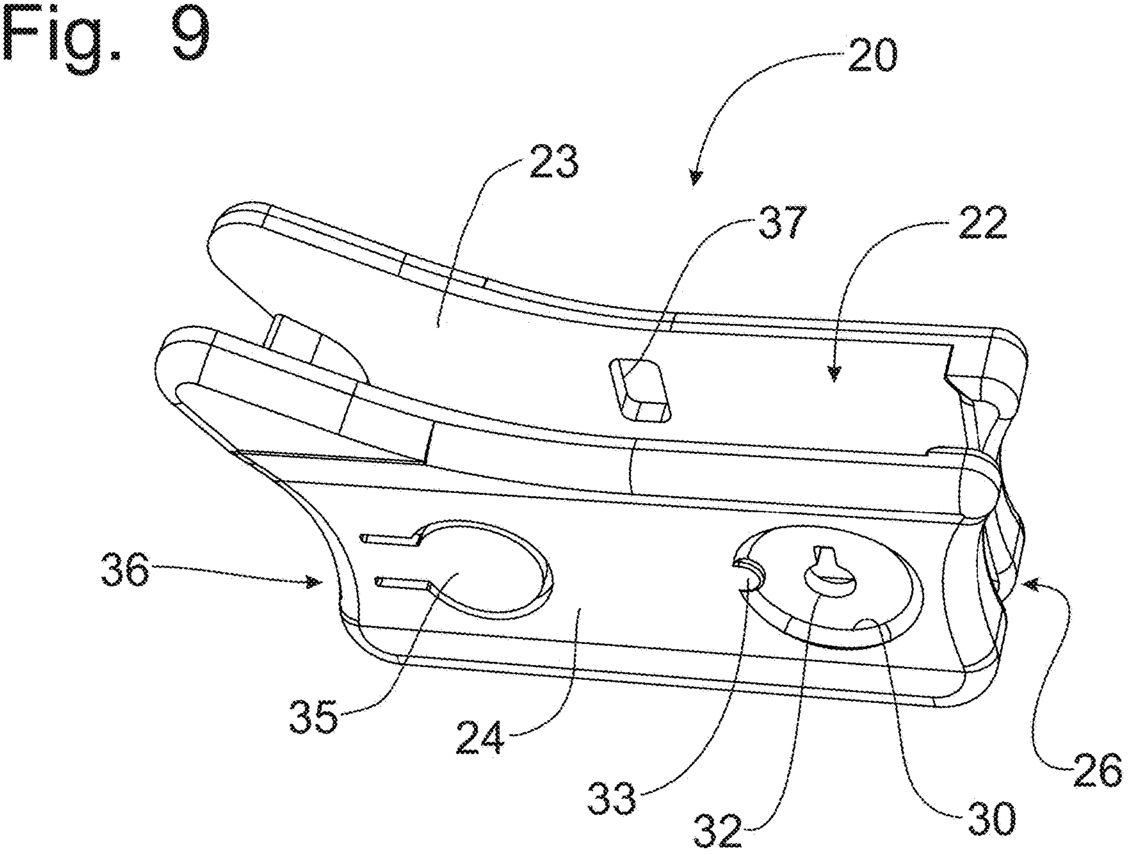
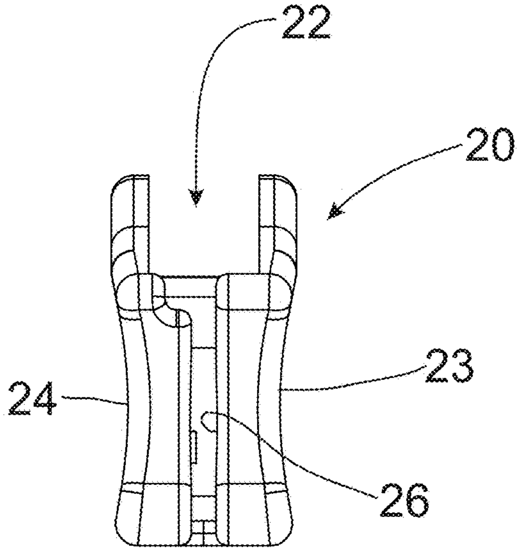
Fig. 10

MODULAR GRIP SYSTEM FOR HANDCUFFS

CROSS-REFERENCE TO RELATED PATENTS

This patent application claims priority on U.S. Provisional Patent Application Ser. No. 63/601,320, filed on Nov. 21, 2023, the content of which is incorporated herein.

FIELD OF THE INVENTION

The present invention generally relates to handcuffs and shackles and, more particularly, to a handcuff apparatus that is convertible between a rigid connection relative to the cuffs and a flexible connection, with a removable grip apparatus mountable on the base of each cuff member.

BACKGROUND OF THE INVENTION

Handcuffs are commonly used by police departments, constables and other similar personnel to secure a suspect or prisoner by coupling the suspect's wrists together in a manner that makes use of the secured hands difficult. Typically, the suspect's or prisoner's wrists are secured together behind the person's back to prevent ample movement of the person's arms. The handcuffs are formed with two handcuff members connected together by two or more chain links or a tether that enables the pair of handcuffs to be folded and stored in a pocket or appropriate container. Each handcuff member has a fixed jaw and a movable jaw pivoted to the fixed jaw and having ratchet teeth that securely engage a spring-loaded dog formed on the fixed jaw.

When the movable jaw is ratcheted against the dog, the movable jaw cannot be disengaged from the fixed jaw until the dog is moved out of engagement with the ratchets by manipulation of a locking mechanism. The locking mechanism and spring-loaded dog are housed in a housing or base portion of each cuff member. Access to the spring-loaded dog is obtained by inserting a key through a keyhole to rotate the dog against the corresponding spring which allows the movable jaw to be withdrawn from engagement with the fixed jaw. The housing of each cuff member is generally rectangular in shape and incorporates the dog and spring devices, as well as the lower portion of the fixed jaw.

Generally, handcuffs have a flexible linkage, usually a short chain, interconnecting the two handcuff members. However, some handcuffs have a rigid connector that keeps the prisoner's hands spaced apart a predetermined distance. Examples of a rigid handcuff can be seen in U.S. Pat. No. 647,735, granted to Frank B. Widmayer on Apr. 17, 1900; U.S. Pat. No. 5,613,381, granted to Julie M. Savage on Mar. 25, 1997; and in U.S. Patent Publication No. 2007/0056332, of Kevin L. Parsons, et. al., published on Mar. 15, 2007.

Flexible handcuffs can be converted into rigid handcuffs by overlying the flexible linkage with a pair of opposing rigid members that extend from one handcuff member to the other and encapsulate the flexible linkage. Two examples of such conversion devices can be found in U.S. Pat. No. 4,840,048, granted on Jun. 20, 1989 to Dennis C. Elam, and in U.S. Pat. No. 5,007,257, granted on Apr. 16, 1991, to Charles E. Thompson. In both of these handcuff disclosures, a pair of opposing shells are connected together on opposite sides of the flexible chain to provide a rigid structure between the two handcuff members. In U.S. Pat. No. 5,526,658, granted on Jun. 18, 1996, to Geoffrey W. Cross, et. al., each of the handcuff members have a rigid extension that are interconnected by a series of parallel links that enable a limited amount of flexibility in the handcuff structure. As with the previous references identified above, a pair of shell members having spacers that fit between the links to render the links from pivotal movement and, thereby convert the flexible handcuffs into rigid handcuffs.

U.S. Pat. No. 7,181,935, granted on Feb. 27, 2007, and U.S. Pat. No. 7,010,943 granted on Mar. 14, 2005, both to Alan L. Earl, disclose a grip for handcuffs wherein the grip apparatus is secured over the chain links interconnecting the two opposing cuff members in such a manner that the grip overlaps the lower portion of the base portion of each opposing cuff member but not the entire base portion. This prior art grip apparatus encapsulates the chain links, but incorporates a central hinge device that allows the handcuff to be folded for conventional storage while the grip apparatus is installed. The grip apparatus has an upper member and a lower member that are overlapped to encapsulate the chain links and secured together in a manner that makes the grip apparatus difficult to impossible to remove from the handcuff. The engagement of the base portion of each opposing cuff member is minimal so that the handcuff keyhole is not covered or access thereto obstructed.

Grip devices similar in nature to the Earl grip apparatus can be found in U.S. Pat. No. 6,886,374, granted to Norman E. Clifton, Jr., on May 3, 2005, and in U.S. Design Pat. No. D373,446, granted on Sep. 3, 1996, to Gee-Sook Kim, et al, in which the grip devices are used to convert the otherwise flexible handcuff into a rigid handcuff, like a shackle. In both of these patents, the grip device encompasses the base portions of the opposing cuff members, overlapping the keyhole in each cuff member, requiring openings to permit access to the keyholes. These grip devices are formed of a rigid material, such as steel, and are very specific in utilization.

It would be desirable to provide a grip apparatus that would be mounted on the base portions of the individual cuff members in a manner that would be easily removable if desired and capable of incorporating auxiliary functions to improve on the use and efficiency of the handcuff.

SUMMARY OF THE INVENTION

It is an object of this invention to provide a structure for a handcuff apparatus that can easily be converted between a flexible configuration and a rigid configuration.

It is another object of this invention to provide an accessory rail on the bottom of the housing of the handcuff apparatus.

It is a feature of this invention that the accessory rail is formed with a T-shaped slot into which an accessory can be supported.

It is an advantage of this invention that the accessory can be a spacer that interconnects accessory rails on both handcuff members to convert the handcuff apparatus into a rigid configuration.

It is another feature of this invention to provide an accessory rail that can be used to support any desired accessory from the housing of a handcuff member.

It is still another object of this invention to provide a grip apparatus for a handcuff housing to facilitate handling the handcuff members while in use.

It is another advantage of this invention that a double lock button can be accessed through the grip apparatus.

It is another advantage of this invention that the officer operating the handcuff apparatus has a greater measure of control over the movement of the person being restrained by the handcuffs.

It is yet another object of this invention to provide a handcuff apparatus that is convertible between flexible and rigid configurations which is durable in construction, inexpensive of manufacture, facile in assemblage, and simple and effective in use.

These and other objects, features and advantages can be accomplished by a handcuff apparatus having accessory rails formed on the bottom surface of the housing for the handcuff members. The accessory rail can have a T-shaped configuration to provide support for desired accessories, such as a spacer that will extend between accessory rails on the housings of opposing handcuff members to convert the handcuff apparatus into a rigid handcuff configuration. Placement of the spacer can be made on accessory rails on either or both opposing sides of the mount for connecting the flexible tether between the handcuff members. The accessory rails can also be used to mount other accessories, such as a GPS/cellular tracking device. A grip apparatus is also provided to facilitate the engagement of the handcuff members. The grip members can have a recessed keyhole surrounded by LEDs and a double lock button accessible through the grip member. The grip member is removable from the housing.

BRIEF DESCRIPTION OF THE DRAWINGS

The advantages of this invention will be apparent upon consideration of the following detailed disclosure of the invention, especially when taken in conjunction with the accompanying drawings wherein:

FIG. 7 is a top plan view of the grip apparatus shown in FIG. 1;

FIG. 8 is a side elevational view of the grip apparatus shown in FIG. 2;

FIG. 9 is a perspective view of the grip member shown in FIG. 3;

FIG. 10 is an end view of the grip apparatus shown in FIG. 2; and

DETAILED DESCRIPTION OF THE PREFERRED EMBODIMENT

Figure 1:
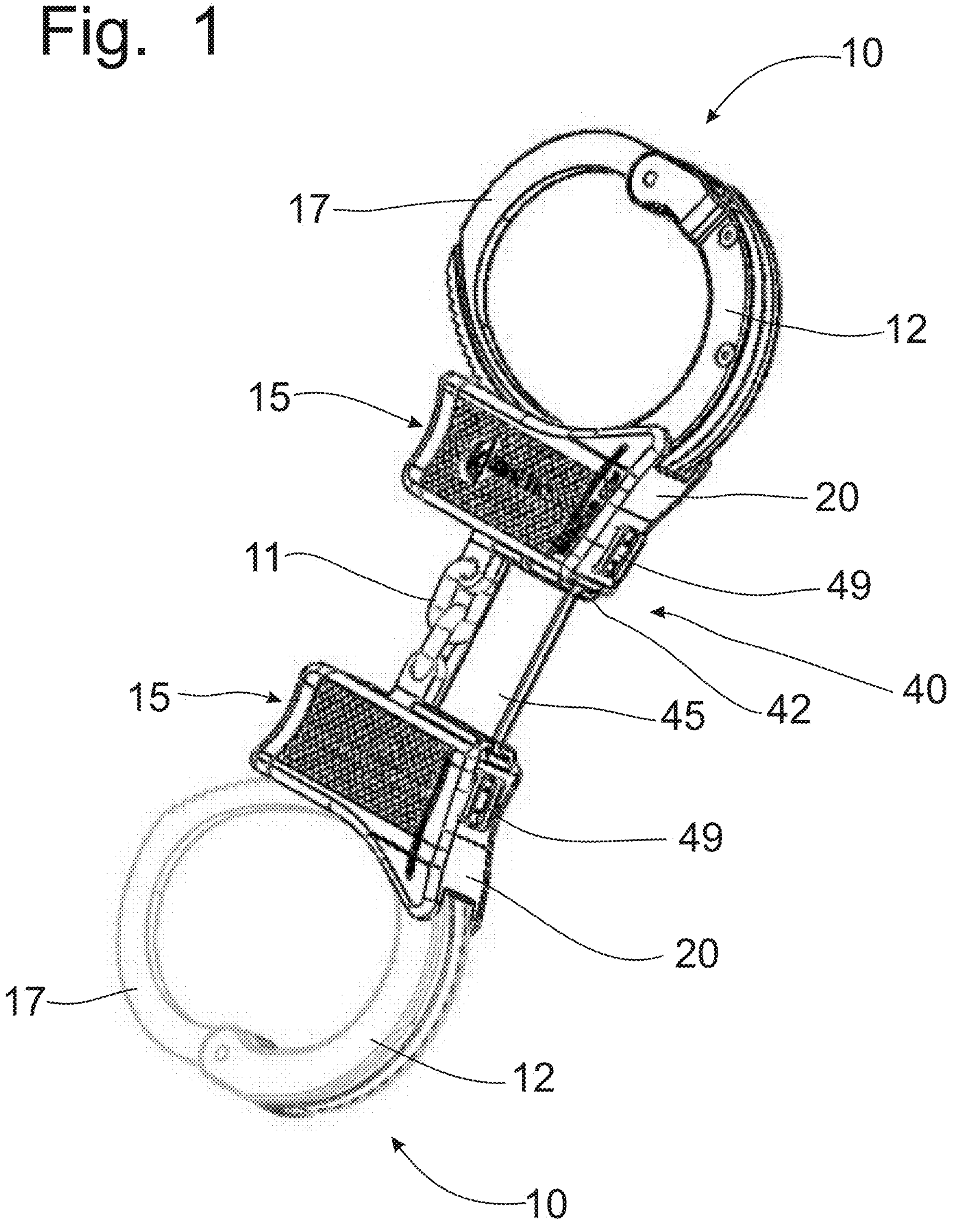
FIG. 1 is a perspective view of handcuffs incorporating the principles of the instant invention by which a flexible handcuff configuration has been converted into a rigid handcuff configuration.

Referring to the drawings, a pair of handcuffs incorporating the principles of the instant invention can best be seen. Each handcuff member 10 is constructed with a fixed arcuate jaw 12 having opposed face members 13, 14 and a housing 15 for the lock mechanism 20. A movable arcuate jaw 17 is formed with a saw tooth ratchet (not shown) on one side thereof and is pivotally connected by a pivot 19 to the distal end of the fixed jaw 12 thereof. The pivotal movement of the arcuate movable jaw 17 in one direction, corresponding to the insertion of the tip of the movable jaw 17 into the lock housing 15, allows the arcuate jaw 17 to pass between the opposing face members 13, 14 of the fixed jaw 12 and completely circle around the pivot 19 unless an object, such as a wrist, is captured between the fixed and movable jaws 12, 17.

The lock housing 15 encloses a conventional handcuff locking mechanism 16 that has a mating ratchet member formed with a reverse saw tooth ratchet that is pivotally supported within the lock mechanism between an engagement position and a non-engagement position corresponding to the engagement of the ratchet on the movable jaw. Alternatively, the locking mechanism 16 can utilize a spring-loaded dog (not shown) that will engage the ratchet mechanism (not shown) on the movable jaw 17 to allow movement of the movable jaw 17 in one direction relative to the fixed jaw. The locking mechanism 16 is arranged such that the insertion of a key into the keyhole formed in the housing 15 and rotated appropriately will affect pivotal movement within the housing to release the movable jaw from restrictive engagement with the fixed jaw. The chain 11 is fastened to the underside of the opposing housings 15 to interconnect the two handcuffs. A remote keyhole 18 located at the distal end of the fixed jaw 12 can be used to disengage the movable jaw from the fixed jaw, according to the principals of the invention described in U.S. Pat. No. 8,336,345, granted on Dec. 25, 2012, to Stephen T. Burgoon.

Referring now to FIGS. 1-5, a conversion apparatus 40 for converting the pair of handcuffs from a flexible configuration to a rigid configuration can best be seen. As with conventional flexible handcuffs, the opposing housings 15 of the handcuff members 10 are interconnected by a flexible member, such as a short length of chain 11 such that the individual handcuff members can be folded over against one another to permit convenient storage of the handcuffs on the officer's duty belt. Adjacent to the connection of the chain 11, each handcuff housing 15 is formed with an accessory rail 42 on the underside of the housing 15. The drawings show only one accessory rail 42 to one side of the mount **11*a* for the connection of the chain 11 to the housing 15. However, one skilled in the art will recognize that an accessory rail 42 can be formed in the housing on both sides of the mount 11*a*** for use as described in greater detail below.

Figure 2:
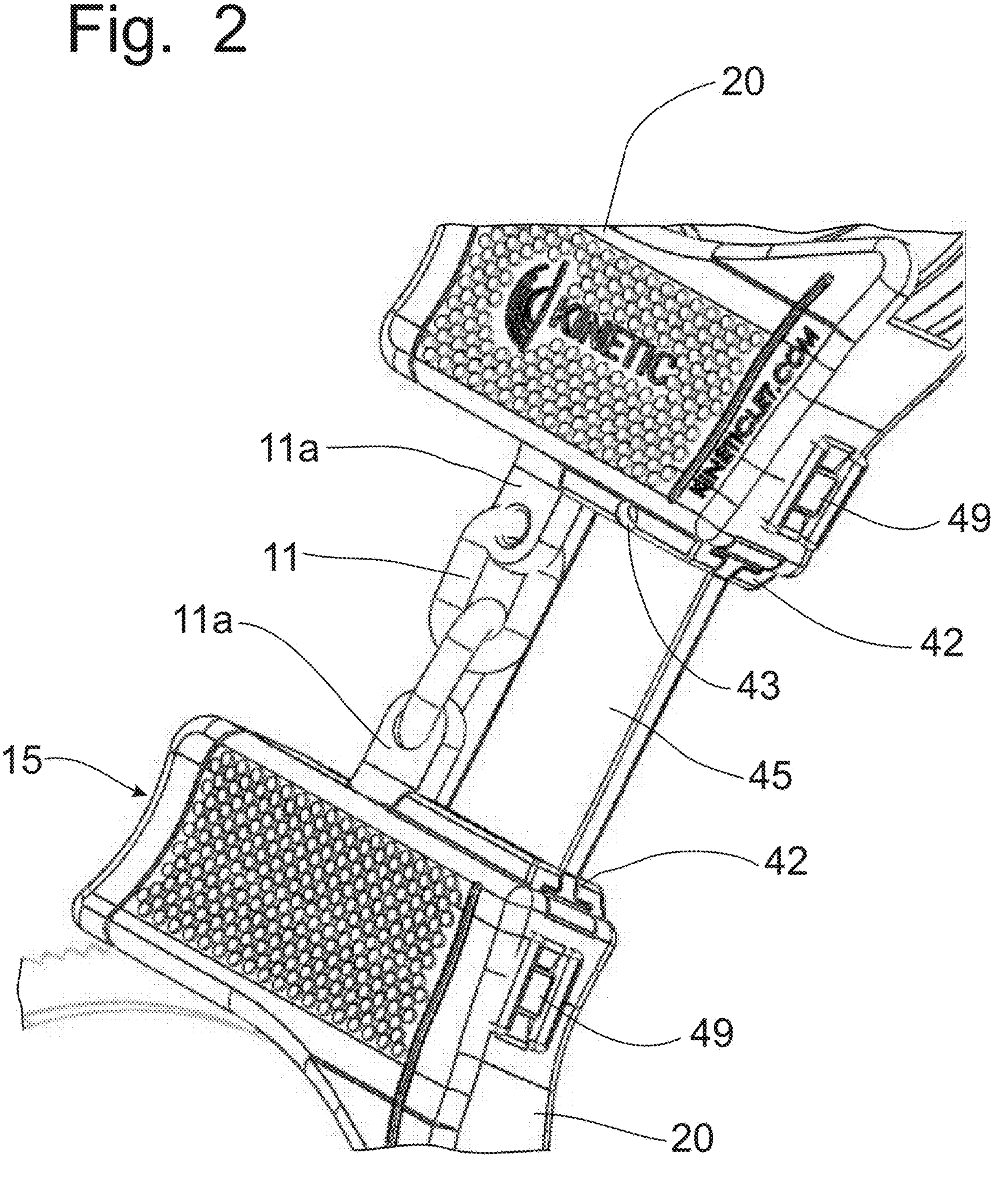
FIG. 2 is an enlarged partial perspective view of the apparatus used to convert the handcuffs as shown in FIG. 1.
Figure 3:
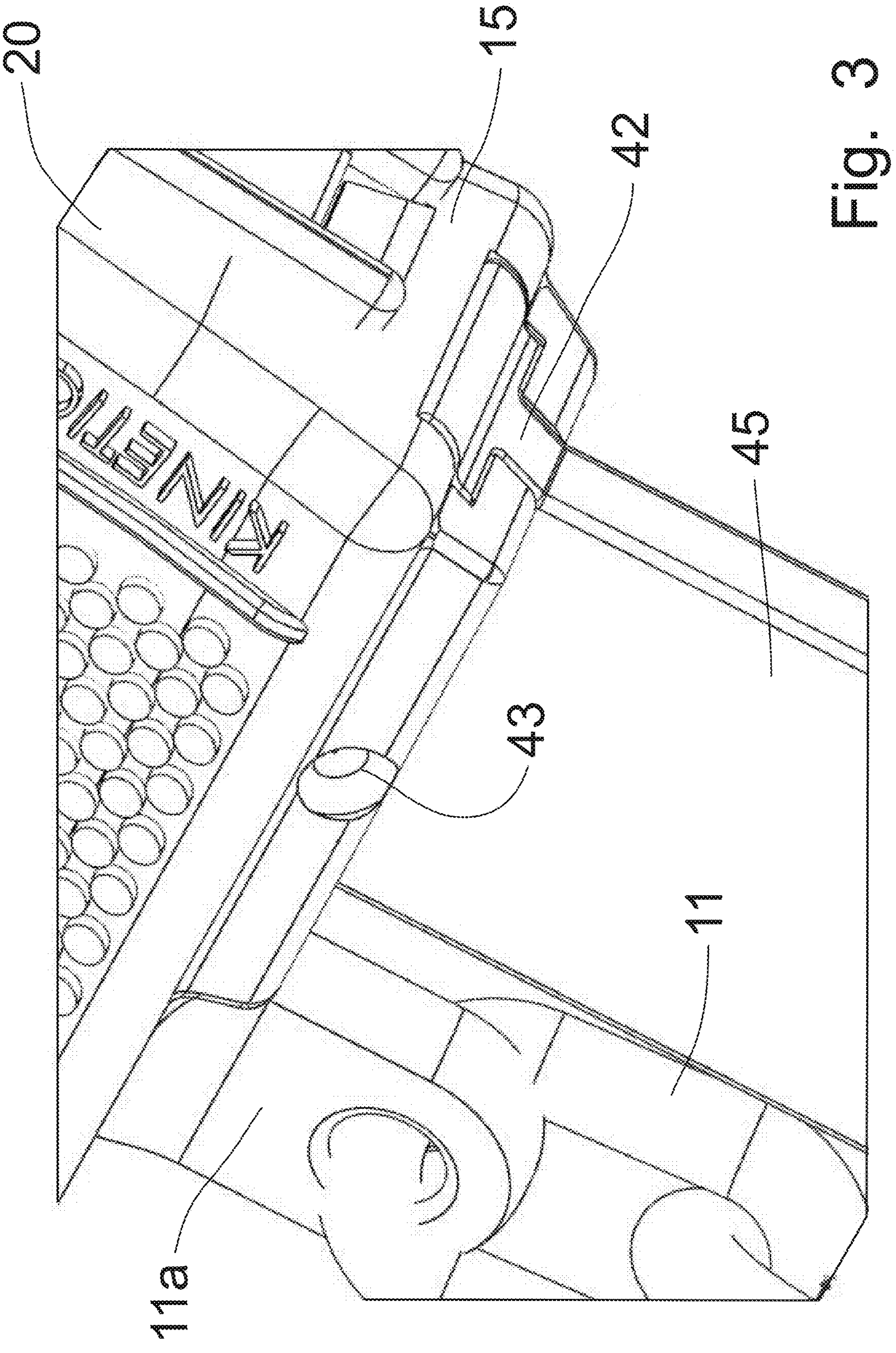
FIG. 3 is an enlarged perspective view of the connection of the spacer member to the structure of the handcuff member.
Figure 4:
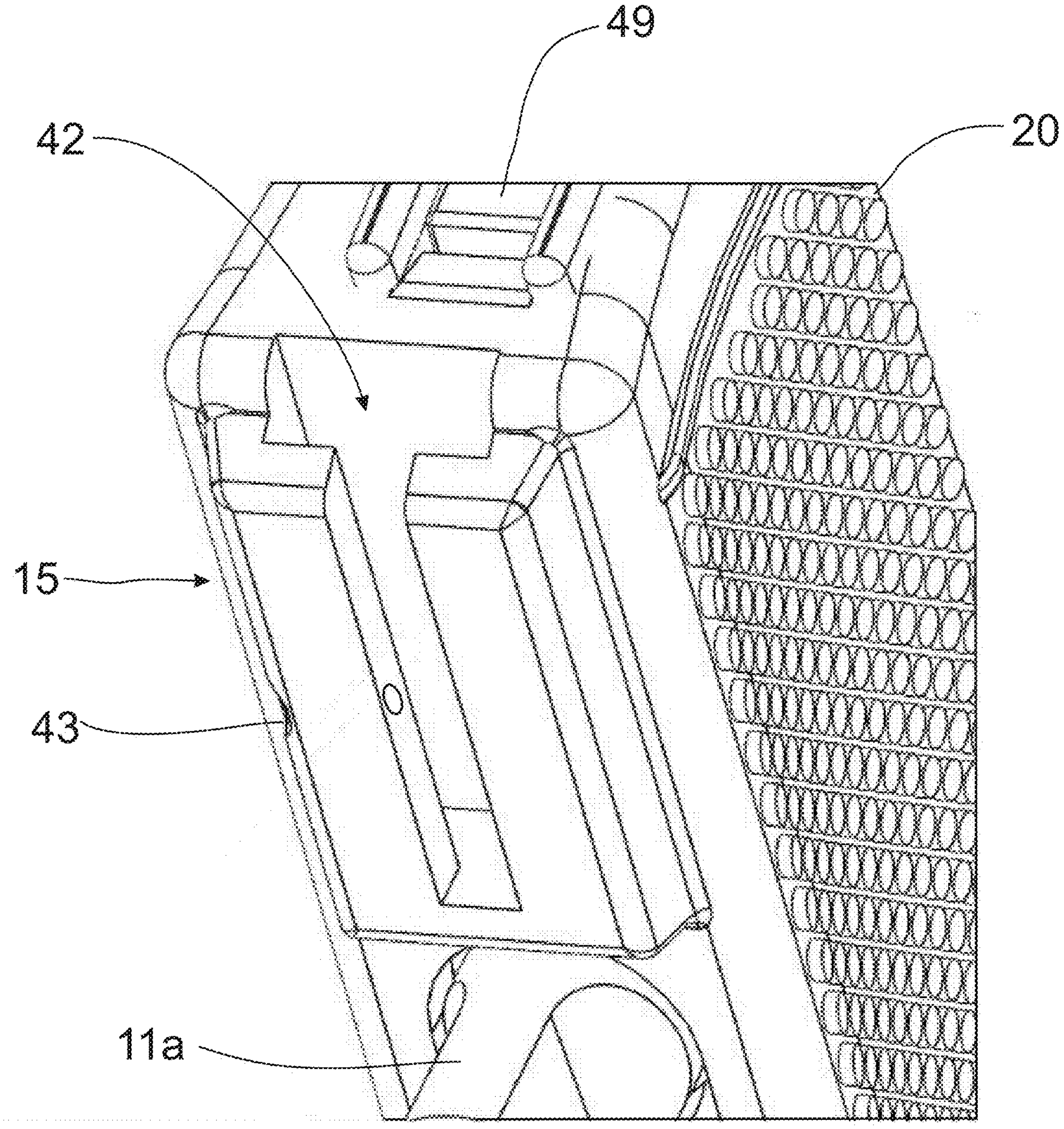
FIG. 4 is an enlarged perspective view of the accessory rail formed in the bottom portion of the structure of the handcuff member.
Figure 5:
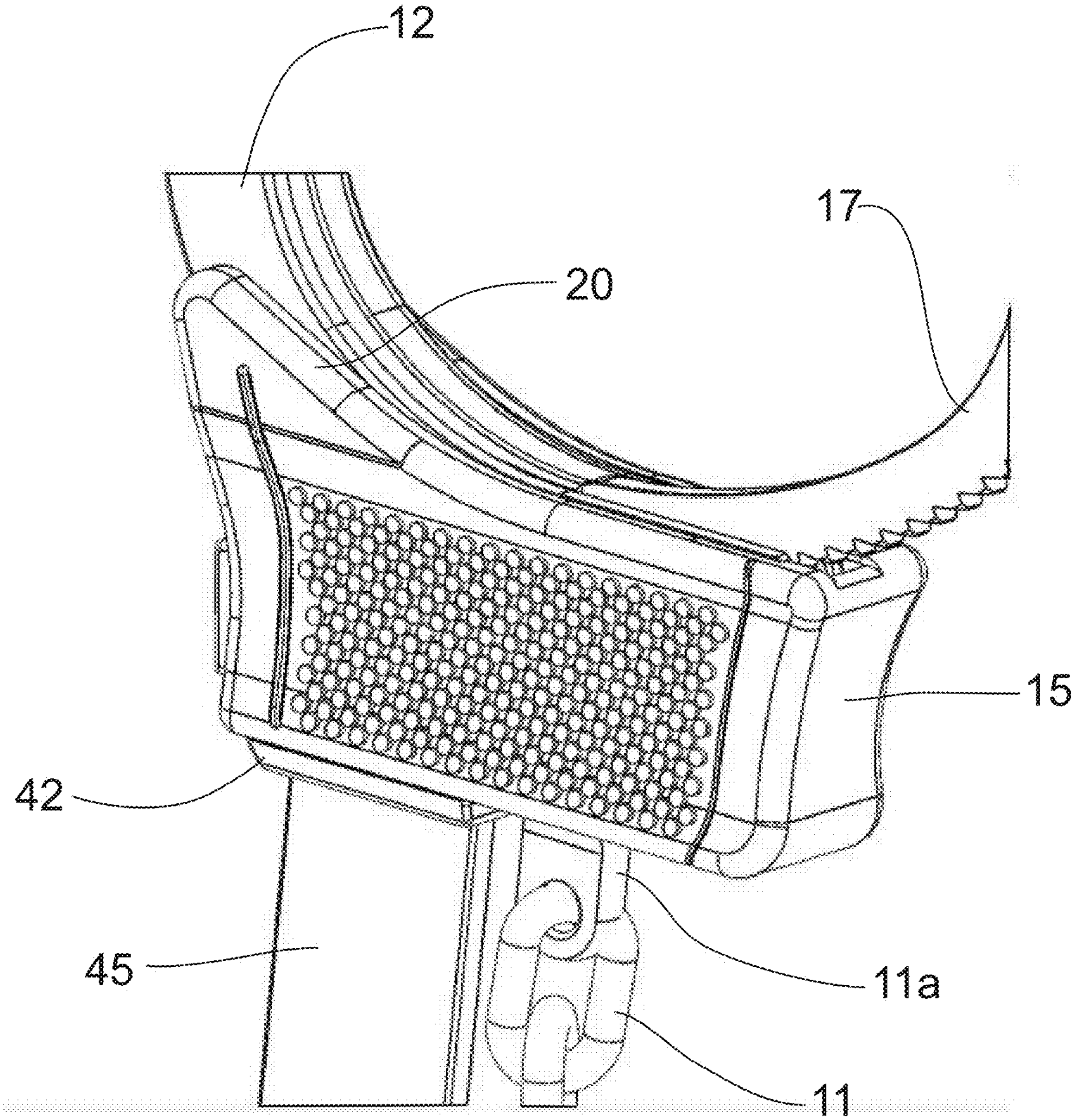
FIG. 5 is a perspective view of the opposing side of the lower portion of the handcuff member from the view in FIGS. 2-4.
Figure 6:
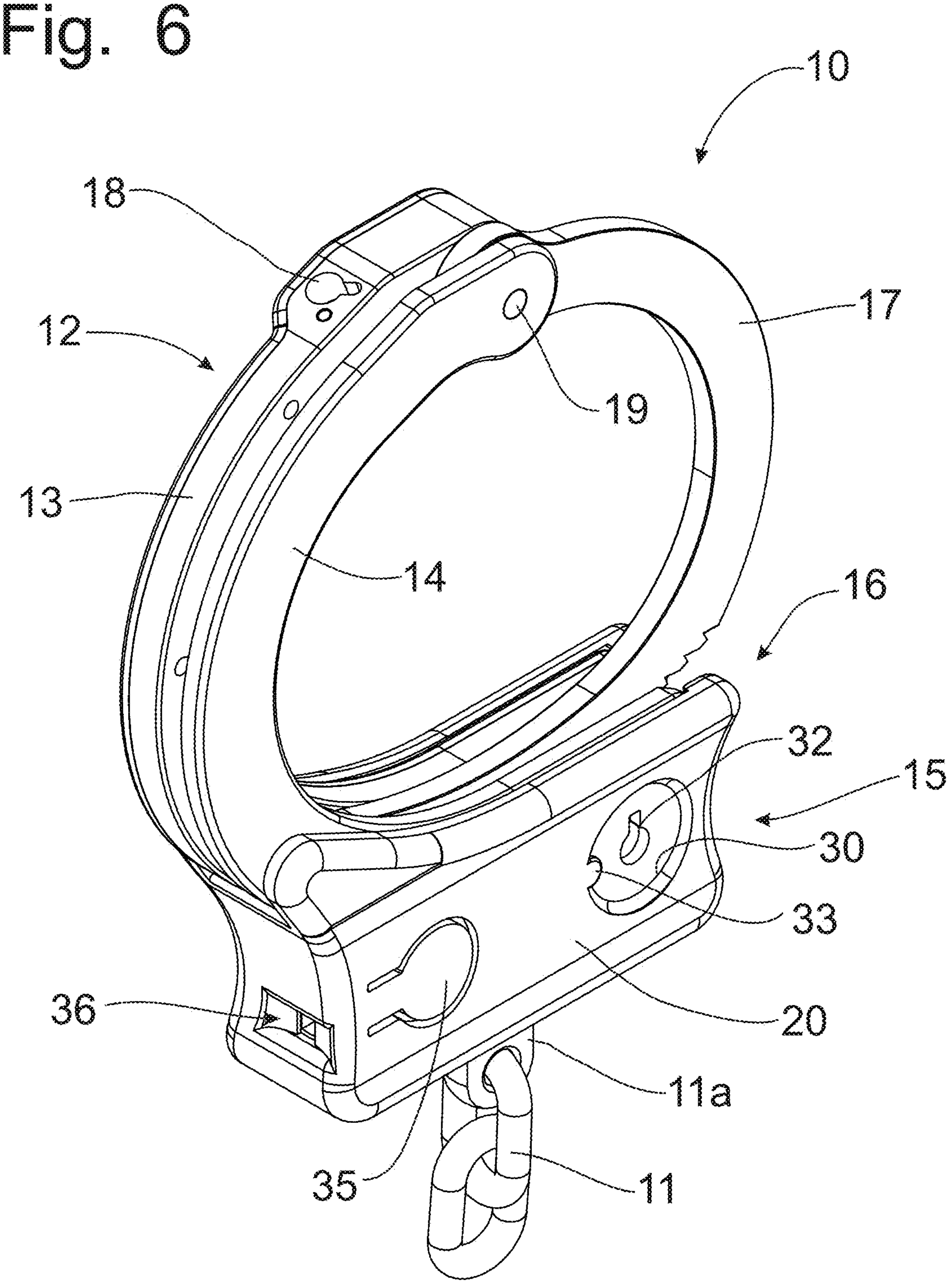
FIG. 6 is a perspective view of a single handcuff member forming part of a pair of handcuffs incorporating the principles of the instant invention, the movable jaw being closed against the fixed jaw and grip apparatus being mounted on the housing of the handcuff member.

The accessory rail 42 is preferably formed in a T-shaped configuration to facilitate the mounting of an accessory to the housing 15 and to maintain the connection of the accessory to the housing 15 in the manner so intended. One skilled in the art will recognize that the shape of the accessory rail 42 can vary, such as an oval or I-shape as examples, so long as the shape of the accessory rail 42 will maintain the integrity of the connection of the accessory to the housing 15. An example of an accessory, is shown in FIGS. 1-3 as a flexible spacer 45. The mounting of at least one spacer 45 into the accessory rail 42 will be operable to convert the pair of handcuffs from a flexible configuration into a semi-rigid configuration. Where housings 15 are formed with two accessory rails on opposing sides of the chain mount **11*a*, a second spacer 45 can be located on the opposing said of the chain mount 11*a* to provide greater integrity for the conversion apparatus 40**.

The spacer 45 is preferably formed of rubber and is sufficiently flexible to permit the cuffs 10 to be folded over for storage in a suitable holder. The rubber spacer 45 provides an improved grip surface for holding the cuffs 10 for engagement with a prisoner. With the rubber spacer 45 in place both cuffs 10 are automatically oriented for engagement with the prisoner's wrists. This spacer 45, which could be referred to as a bridge, can be sized according to the officer using the cuffs 10. For example, female officers will typically have smaller hands than male officers and the bridge 45 can be made smaller to accommodate the corresponding size of hands. With the provision of the accessory rail 42, different accessories can be conveniently attached and secured to the cuffs 10 by the set screw through the opening 43. For example, the bridge 45 could be rigid and used to convert the pair of handcuffs from a flexible configuration to a rigid configuration. Other accessories would include flashlights, GPS devices and the like.

To secure the accessory within the accessory rail 42, a set screw (not shown) can be inserted through the housing 15 via the opening 43 to engage the portion of the accessory received within the accessory rail 42. One skilled in the art will recognize that a pin (not shown) can be inserted through the opening 43 to engage the accessory and restrict movement off the accessory rail 42 until the pin is removed. In the way of an example, another accessory that could be mounted on the accessory rail 42 would include a GPS/cellular tracking unit (not shown) that could be formed to slide into the accessory rail 42 to permit tracking of high risk prisoners. Furthermore, the GPS/cellular tracking unit could be built into the spacer 45.

Double locking of handcuffs is a known apparatus that when engaged after a prisoner has been provided with handcuffs mounted on the prisoner's wrists, the handcuffs cannot be tightened on the prisoner's wrists beyond the original positioning of the movable jaw 17 into engagement with the fixed jaw 12. By double locking, the movable jaw 17 cannot move relative to the fixed jaw 12 in either direction, which prevents the handcuffs 10 from being unlocked with a shim in a known manner. Double locking also prevents the prisoner from tightening the handcuff members 10 to the extent of injury. On the handcuffs shown in FIGS. 1-5, the double lock button 49 is located on the end portion of the housing 15 above the accessory rail 42. Once the double lock button 49 is depressed, the movable jaw 17 cannot be moved in any direction without being previously unlocked by the key (not shown).

Referring now to FIGS. 6-10, a grip apparatus 20 for use with a pair of handcuffs 10 and incorporating the principles of the instant invention can best be seen. One skilled in the art will recognize that the FIGS. 6-10 depict only a single handcuff, but handcuffs come in pairs that are fastened together by a chain 11 or other connecting device that interconnects the housing 15 on each handcuff. Accordingly, the description below is offered in conjunction with only a grip apparatus for one of the pair of handcuffs, as is depicted in FIG. 1.

The purpose of the grip apparatus 20 mounted on the housing 15 is to facilitate the grasping of the handcuffs 10 to secure a suspect's wrists. The grip apparatus 20 can be molded from a number of materials, such as polyvinyl chloride (PVC), as well as other plastic and rubber compounds that will hold shape, be functional as described in greater detail below, and be aesthetically pleasing. The grip apparatus 20 is molded in the form of a shell having a hollow cavity 22 located between spaced apart upright walls 23, 24. The forward portion of the cavity 22 has a vertical opening 26 that will accommodate the sliding of the grip apparatus 20 over the chain links 11, as will be described in greater detail below. One skilled in the art will recognize that the grip apparatus 20 can be used on the housings 15 of conventional handcuffs, as well as in conjunction with the housings 15 on the handcuffs configured as described above to be convertible between flexible handcuffs and rigid handcuffs, except that the shape of the grip apparatus 20 may have to be modified slightly from that shown in FIGS. 6-10 in order to accommodate the accessory rails 42. Accordingly, the shape of the grip apparatus 20 is described herein as being installed on a conventional pair of handcuffs.

The rearward portion of the upright walls 23, 24 is preferably sloped upwardly to provide a surface engagable with the user's thumb if desired. The floor 27 of the grip apparatus 20 is formed with a horizontal slot 28 that is continued from the vertical opening 26. Near the center of the floor 27 the slot 28 expands into a rounded opening 29 that is sized to allow the passage of the chain links 11 and the mount 11*a* onto which the chain links 11 are connected. To provide structural integrity for the grip apparatus 20, the rearward portion of the cavity 22 is formed as a solid wall 21 extending upwardly from the floor 27 to the beginning of the upwardly sloped portions.

One of the upright walls 24 is formed with a recess 30 that includes a keyhole 32 at the center thereof. This keyhole 32 will be aligned with the corresponding keyhole in the housing 15 to access the lock mechanism 26. The recess 30 also includes an LED 33 that shines light onto the keyhole 32 and recess 30 to facilitate the use of a handcuff key to release the lock mechanism 16. Rearwardly of the recess 30 is a switch 35, preferably in the form of a depressible button 35 that directs electricity from a small replaceable battery 36 to the LED 33 to provide a light source when desired. On the opposing upright wall 23, an opening 37 to permit the installation of an RFID chip or a GPS tracking device to keep track of the prisoner wearing the handcuffs.

The grip apparatus 20 can be installed onto any conventional pair of handcuffs 10 as is described herein. The grip apparatus 20 is aligned with the first chain link 11 and slid over the chain link 11 with the chain link 11 passing through the vertical opening 26 and along the slot 28 until the chain link 11 is aligned with the hole 29 in the center of the floor 27 of the grip apparatus 20. The grip apparatus 20 can then be pushed upwardly onto the housing 15 such that the mount 11*a* is extended through the hole 29 and such that the upright walls 23, 24 cover the opposing sides of the housing 15. With the grip apparatus 20 in proper placement, the user's hands will be less likely to slip off the handcuffs, particularly in situations where the housing 15 is wet. Preferably, the material from which the grip apparatus 20 is molded will provide a tacky touch. Alternatively, the outer surface of the upright walls 23, 24 can have knurling formed therein to increase grip capabilities or other non-slip surfaces.

It will be understood by one of ordinary skill in the art that the grip apparatus 20 can be utilized on conventional handcuff configurations, as well as the remote lock configuration described in U.S. Pat. No. 8,336,345 noted above and the convertible handcuff configuration as described above. FIGS. 1-5 depict the grip apparatus as having an alternative knurled grip surface, as compared to the otherwise plain grip surface shown in FIGS. 6-10.

Figure 11:
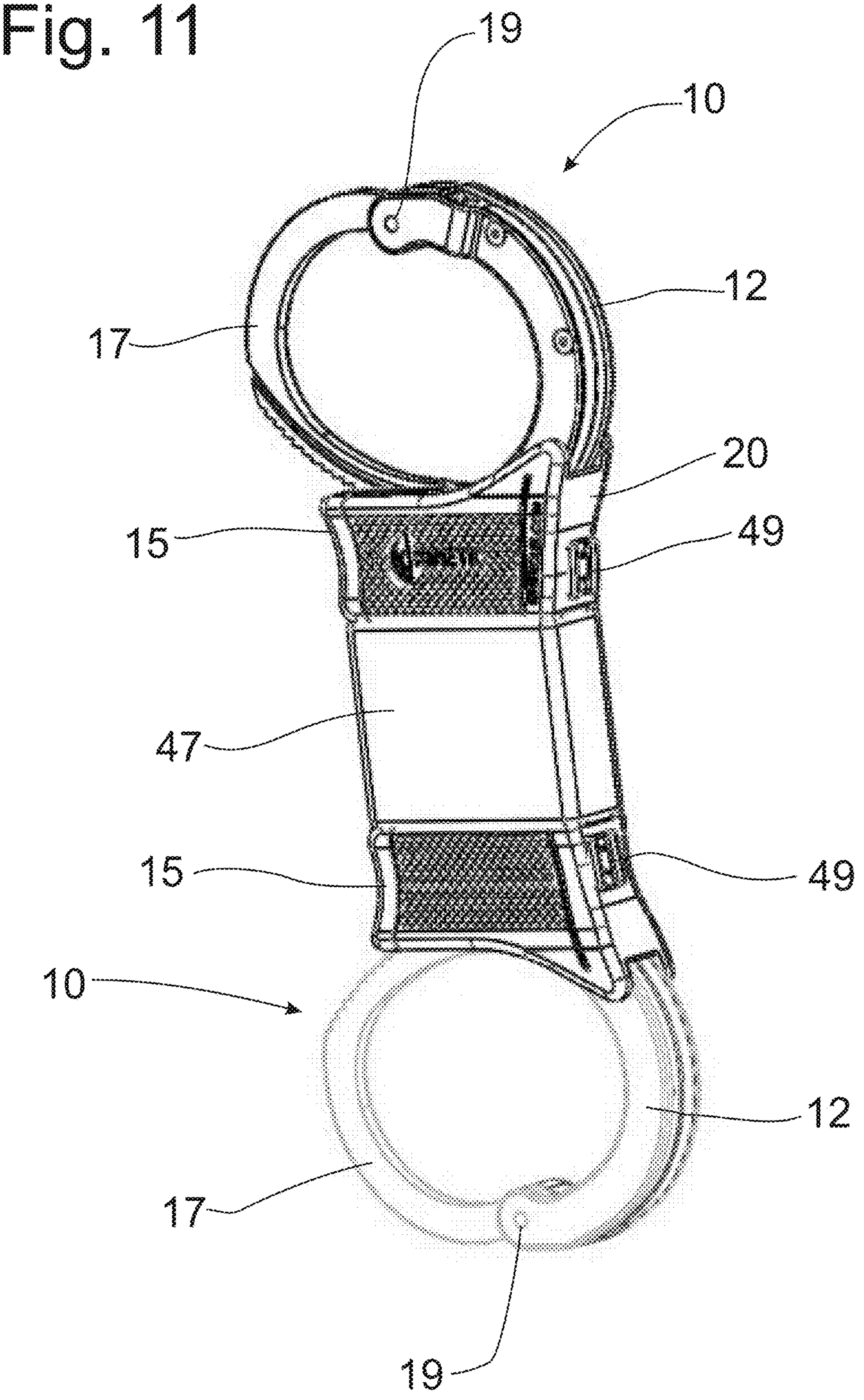
FIG. 11 is perspective view similar to that of FIG. 1, but showing an alternative configuration of a rigid handcuff.

An alternative handcuff configuration is shown in FIG. 11 in which the grip apparatus 20 is applied to the housings 15 of the handcuffs members 10 and the connection between the handcuff members 10 is a rigid connection by sliding a full sized spacer 47 onto full length accessory rails 42. In such a configuration, the handcuffs do not utilize a flexible chain 11 and the handcuffs would not be convertible into a flexible handcuff configuration.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiments of the invention; however, concepts, as based upon the description, may be employed in other embodiments without departing from the scope of the invention. For example, the principles of the instant invention can also be applied to leg restraints to provide an improved grip and orientation of the restraints.

Having thus described the invention, what is claimed is:

1. A handcuff apparatus, comprising:

first and second handcuff members having a housing;

a flexible connector interconnecting said first and second handcuff members at a mount;

an accessory rail integrally formed on a bottom surface of each said housing, said accessory rail defining a cavity having a slotted opening therein providing a T-shaped configuration; and an accessory formed with a T-shaped mounting configuration corresponding to the T-shaped configuration of the cavity and slotted opening of each said accessory rail and being selectively engagable into said cavity through said slotted opening of at least one of said accessary rails such that said accessory is carried by the corresponding said housing.

2. The handcuff apparatus claim 1, wherein said accessory is engagable with accessory rails on each of said handcuff members.

3. The handcuff apparatus of claim 2, wherein said accessory is a spacer having a predetermined length to convert said handcuff apparatus from a flexible configuration into a rigid configuration.

4. The handcuff apparatus of claim 1, wherein said accessary rail is formed to extend from said mount to an outward corner of the corresponding said housing.

5. The handcuff apparatus of claim 4, wherein each said housing includes one of said accessory rails on opposing sides of said mount such that one of said accessories can be mounted on opposing sides of said mount.

6. The handcuff apparatus of claim 5, wherein said accessory is a pair of spacers having a predetermined length and being positionable on the accessory rails on opposing sides of said mount to convert said handcuff apparatus from a flexible configuration into a rigid configuration.

7. The handcuff apparatus of claim 1, wherein said accessory rail includes a fastener opening for the insertion of a fastener into engagement with said accessory in order to secure the accessory to the corresponding accessory rail.

8. The handcuff apparatus of claim 1, further comprising:

a grip apparatus formed as a shell having an upper portion having a cavity therein defined by a pair of side walls, a forward wall, a rearward wall and a bottom wall, the side walls being spaced apart sufficiently to receive said housing of the handcuff into said cavity; and a slotted opening formed in said forward wall to permit the vertical passage of the flexible connector into said cavity, said slotted opening extending into said bottom wall and terminating in said bottom wall at a centrally located passageway.

9. The handcuff apparatus of claim 8, wherein the grip apparatus includes:

a keyway formed in one of said side walls for the engagement of a cuff key into a lock mechanism within said handcuff housing; and a lighting device surrounding said keyway, said lighting device being operatively coupled to a switch housed within one of said side walls to activate said lighting device, said switch being located on the same side wall as said keyway and spaced therefrom.

10. The handcuff apparatus of claim 8, wherein said grip apparatus is molded from plastic or rubber compounds that will hold the formed shape.

11. The handcuff apparatus of claim 10, wherein each said housing includes a double lock button accessible through the grip apparatus.

12. A handcuff apparatus convertible between a flexible configuration and a rigid configuration, comprising:

first and second handcuff members having a housing;

a flexible connector interconnecting said first and second handcuff members at a mount;

an accessory rail mounted on a bottom surface of each said housing and having a cavity with a T-shaped opening; and a spacer formed with a mounting configuration corresponding to said accessory rails and being selectively engagable onto opposing corresponding said accessary rails such that said spacer is selectively carried by the housings to render the handcuff apparatus into a rigid configuration, each said accessory rail having an opening therein for engagement of a fastener to secure the position of said spacer with respect to the corresponding said accessory rail.

13. The handcuff apparatus of claim 12, wherein each said housing includes one of said accessory rails on opposing sides of said mount such that a spacer can be mounted on the accessory rails on opposing sides of said mount.

* * * * *